United States Patent
Hagström et al.

(10) Patent No.: US 10,578,326 B2
(45) Date of Patent: Mar. 3, 2020

(54) CONTROLLING INDOOR ENVIRONMENTAL CONDITION

(71) Applicant: Halton Oy, Kausala (FI)

(72) Inventors: Kim Hagström, Lahti (FI); Ismo Grönvall, Kouvola (FI)

(73) Assignee: HALTON OY, Kausala (FI)

( * ) Notice: Subject to any disclaimer, the term of this patent is extended or adjusted under 35 U.S.C. 154(b) by 243 days.

(21) Appl. No.: 15/000,530

(22) Filed: Jan. 19, 2016

(65) Prior Publication Data

US 2016/0209065 A1   Jul. 21, 2016

(30) Foreign Application Priority Data

Jan. 19, 2015   (EP) .................................... 15151633

(51) Int. Cl.
| | |
|---|---|
| *F24F 11/30* | (2018.01) |
| *F24F 11/62* | (2018.01) |
| *A61G 13/10* | (2006.01) |
| *F24F 3/16* | (2006.01) |
| *G05B 15/02* | (2006.01) |
| *F24F 120/10* | (2018.01) |

(52) U.S. Cl.
CPC ............ *F24F 11/30* (2018.01); *A61G 13/108* (2013.01); *F24F 3/161* (2013.01); *F24F 11/62* (2018.01); *G05B 15/02* (2013.01); *F24F 2120/10* (2018.01)

(58) Field of Classification Search
USPC ....................................................... 700/276
See application file for complete search history.

(56) References Cited

U.S. PATENT DOCUMENTS

| | | | |
|---|---|---|---|
| 5,170,935 A | 12/1992 | Federspiel et al. | |
| 5,822,883 A | * 10/1998 | Horwitz | .................. D06F 58/22 |
| | | | 34/494 |
| 9,456,183 B2 | * 9/2016 | Brackney | ........... G06K 9/00771 |

(Continued)

FOREIGN PATENT DOCUMENTS

| | | |
|---|---|---|
| EP | 1279902 | 1/2003 |
| FR | 2854595 | 11/2004 |

(Continued)

OTHER PUBLICATIONS

Surinder Mehta, Evaluating Textiles and Apparel for Controlling Contamination in Cleanrooms, 1992, Performance of Protective clothing: fourth volume, ASTM STP 1133, American Society for Testing and Materials (Year: 1992).*

(Continued)

*Primary Examiner* — James J Lee
*Assistant Examiner* — Christopher W Carter
(74) *Attorney, Agent, or Firm* — Ware, Fressola, Maguire & Barber LLP

(57) ABSTRACT

According to examples a system, a method and a computer program for controlling at least one indoor environmental condition of a room, comprising: At least one processor, and at least one memory storing program instructions that, when executed by the at least one processor, cause the apparatus to: Receive data of a number of persons within the room. Receive second data of a clothing of the persons. Based on the first and the second data, send a signal to at least one hvac de-vice of the room configured to control a level of a cleanness of the indoor environmental condition.

19 Claims, 15 Drawing Sheets

(56) References Cited

U.S. PATENT DOCUMENTS

| | | | | |
|---|---|---|---|---|
| 2010/0289643 A1* | 11/2010 | Trundle | ............... | F24F 11/0086 |
| | | | | 340/545.1 |
| 2011/0112854 A1* | 5/2011 | Koch | ..................... | G06Q 10/04 |
| | | | | 705/2 |
| 2013/0325196 A1 | 12/2013 | Basson et al. | | |
| 2014/0358291 A1* | 12/2014 | Wells | ................ | G05D 23/1902 |
| | | | | 700/276 |

FOREIGN PATENT DOCUMENTS

| | | |
|---|---|---|
| JP | H06137639 A | 5/1994 |
| JP | H0780194 A | 3/1995 |
| JP | H0854139 A | 2/1996 |
| JP | 2002303436 A | 10/2002 |
| JP | 2007205625 A | 8/2007 |
| JP | 2008266849 A | 11/2008 |
| JP | 2009274050 A | 11/2009 |
| JP | 2013184703 A | 9/2013 |
| JP | 2014130001 A | 7/2014 |
| WO | 2011145732 | 11/2011 |
| WO | WO-2013043401 A1 * 3/2013 ............ C12M 23/14 |

OTHER PUBLICATIONS

FR2854595 English Language Abstract (1 page).
Office Action in Japan Patent Application 2016-006370 and English Translation, dated Nov. 5, 2019 (8 pages).

\* cited by examiner

CONTROLLING INDOOR ENVIRONMENTAL CONDITION

CROSS-REFERENCE TO RELATED APPLICATIONS

This application claims benefit to European Patent Application Number: EP15151633.3, filed 19 Jan. 2015, which is incorporated by reference in its entirety.

TECHNICAL FIELD

The present invention relates to HVAC. In particular, the present invention relates to HVAC control of a room.

BACKGROUND

HVAC (heating, ventilating, and air conditioning) is the technology of indoor environmental comfort. Its goal is to provide thermal comfort and acceptable indoor air quality. HVAC system design is a subdiscipline of mechanical engineering, based on the principles of thermodynamics, fluid mechanics, and heat transfer. Refrigeration is sometimes added to the field's abbreviation as HVAC&R or HVACR, or ventilating is dropped as in HACR (such as the designation of HACR-rated circuit breakers). HVAC is important in the design of indoors, where safe and healthy building conditions are regulated with respect to temperature and humidity, using fresh air from outdoors.

Ventilating (the V in HVAC) is the process of changing or replacing air in any space to provide high indoor air quality, for example to control temperature, replenish oxygen, or remove moisture, odors, smoke, heat, dust, airborne bacteria, and carbon dioxide. Ventilation is used to remove unpleasant smells and excessive moisture, introduce outside air, to keep interior building air circulating, and to prevent stagnation of the interior air. Ventilation includes both the exchange of air to the outside as well as circulation of air within the building. It is one of the most important factors for maintaining acceptable indoor air quality in buildings. Methods for ventilating a building may be divided into mechanical or forced and natural types.

SUMMARY

An objective of the present invention is to provide a control of at least one HVAC device of a room.

According to examples a system, a method and a computer program for controlling at least one indoor environmental condition of a room, comprises:
at least one processor, and at least one memory storing program instructions that, when executed by the at least one processor, cause the apparatus to: Receive data of a number of persons within the room. Receive second data of a clothing of the persons. Based on the first and the second data, send a signal to at least one hvac device of the room configured to control a level of a cleanness of the indoor environmental condition.

For example, based on the data on the number of person within the room, the apparatus is configured to send a signal to at least one hvac device of the room configured to control a level of a cleanness of the indoor environmental condition. The level of cleanness of the room can be controlled quite instantly right after the data has been obtained. Consequently, the feedback loop of detecting merely the outputted air can be avoided, and the control of the level of cleanness of the air within the room may be more instant. For example, the level of cleanness can be controlled before it can actually be measured, due to controlling it based on the level of sources of impurities.

At least one of the afore-mentioned implementation examples offers one or more solutions to the problems and disadvantages of known prior art. Other technological benefits of the present invention become evident to a person skilled in the art from the following description and the claims. The numerous examples of implementing the present invention achieve only a part of the presented advantages. None of the advantages is critical to the examples of implementation. Any required embodiment can technically be combined with any other required embodiment. The examples represent only a few advantageous embodiments and they do not limit the idea of the invention that can be implemented even in other manners within the framework of the claims presented further below.

BRIEF DESCRIPTION OF THE DRAWINGS

The attached figures illustrate examples of embodiments of the present invention, and together with the above general description and the detailed current embodiments help explain, by way of examples, the principles of the invention.

DETAILED DESCRIPTION

Figure 1:
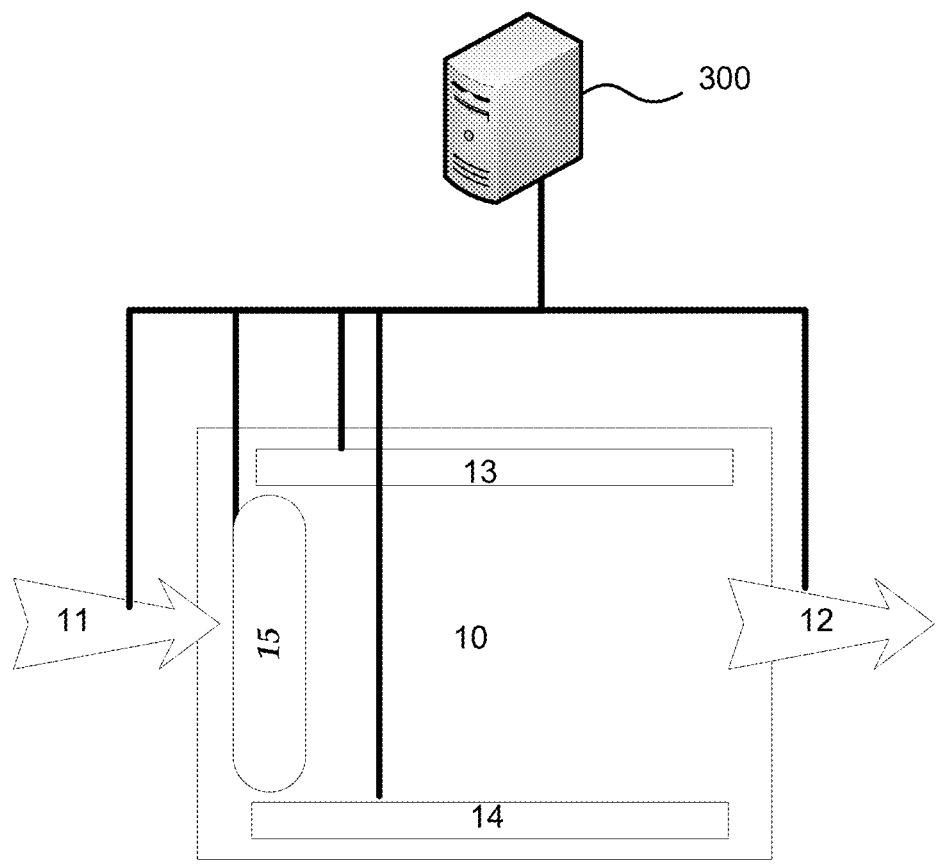
FIG. 1 is an example of a schematic diagram of a room in accordance with an embodiment.

In the example of FIG. 1, an indoor environmental condition of a room 10 is shown. For example, the room 10 may be a clean room, which has an operation subject to a contamination. Examples of the clean room may be an operation room (OR) for a medical operation. Other examples of the room 10 may be indoors, which are subject to control the level of cleanness of the indoor environmental conditions of the room 10, for example, a room within a hospital. Pharmacy indoors, manufacturing or processing spaces may be other examples. Electronics or fine mechanics manufacturing or processing rooms may be another kind of examples. Biological or microbiological manufacturing or processing spaces may be other examples. The room comprises HVAC devices 11, 12, 13, 14 configured to control the indoor environmental condition of the room 10. Input ventilation device 11 and output ventilation device 12 are configured to control the ventilation of the room. An apparatus 300 is configured to control the ventilation devices 11, 12 for the level of the cleanness of the room 10. Furthermore, the ventilation devices 11, 12 may be configured to detect the level of the cleanness of the room 10. For example, the amount of impurities, particles, gasses, etc. may be controlled or detected from the air of the room 10. Thus, the ventilation devices 11, 12 are configured to control a level of cleanness of the indoor environmental condition of the room 10. The level of the cleanness may partly be based on an amount of a ventilation of the room 10. The level of the cleanness may partly be based on an amount of a ventilation of the room 10, an amount of air entering the room, and an amount of air leaving the room. The air entering the room 10 may be made hygienic. The room further comprises a heating device 14 and a cooling device 13, which both are also configured to the control of the indoor environmental conditions. The HVAC devices 11, 12, 13, 14 are coupled with an apparatus 300 configured to control the indoor environmental conditions of the room 10. The apparatus 300 may control each HVAC device 11, 12, 13, 14 individually. For example, an excess pressure may be created in the room 10 by inputting more air with the input ventilation device 11 than air exiting the room by output ventilation device 12. For another example, a reduced pressure may be created in the room 10 by outputting more air by the output ventilation device 12 than input of the input ventilation device 11.

In an example, the room 10 comprises also a detector 15 configured to detect persons within the room. For example, the detector 15 is configured to detect a number of persons within the room 10. The detector 15 may be a part of the system of the real estate facility of the room 10 so that the number of persons within the room 10 can be obtained from the system. Data of the detector 15 is sent to the control apparatus 300 for controlling the level of the cleanness of the indoor environmental condition. The number of persons may also be manually entered. Consequently, the apparatus 300 may be linked with a system having data of the number of the persons within the room 10. For example, an access control system of the real estate may provide the data. The number of persons within the room 10 can be detected by the detector 15, for example, by a direct detection, or based on detecting persons entering and leaving the room 10. The number of persons may be furthermore manually entered or corrected, added, etc. The number of persons may be based on a database of a computing system.

According to an example, the apparatus 300 receives data of a clothing of the persons within the room 10. Type or quality of the clothing worn by the persons within the room 10 is entered to the apparatus 300. This may relate to protective or special clothing the persons are wearing when they are inside the room 10. The type or the quality of the special clothing and characteristics are known and can be given to the apparatus 300. For example, the data may relate to released particles from the clothing, insulation of the clothing, etc.

Based on the data on the number of person within the room 10, and for example based on the data of to the clothing of the persons, the apparatus 300 is configured to send a signal to at least one hvac device of the 10 room configured to control a level of a cleanness of the indoor environmental condition. The level of cleanness of the room 10 can be controlled quite instantly right after the data has been obtained. Consequently, the feedback loop of detecting merely the outputted air can be avoided, and the control of the level of cleanness of the air within the room 10 may be more instant. For example, the level of cleanness can be controlled before it can actually be measured, due to controlling it based on the level of sources of impurities.

A mode of operation carried within the room 10 may affect the controlled level of cleanness. For example, the level of cleanness of the indoor environmental condition is based on a certain operation, which is carried out within the room 10. The operation launches the apparatus 300 to set a certain level of cleanness, for example directly. Furthermore, the control may be dynamic. For example, an action takes place, when carrying out the operation, and the apparatus 300 receives data of the action so that the level of cleanness of the indoor environmental condition is based on the action. This may be temporary or more stable change of the level of the cleanness. Furthermore, the control may be based on a time. For example, the room 10 may be flushed before the start of the operation for a certain period of time. After the operation, an economy mode is engaged, etc.

Furthermore, the apparatus 300 is configured to receive data indicating that a door of the room 10 is opened. The door of the room 10 contains a detector detecting whether the door is open or closed. Based on the detecting that the door is open, the apparatus 300 is configured to send a signal to the at least one hvac device for temporarily increase a performance of the at least one hvac device configured to control the level of the cleanness. Consequently, a temporary boost for HVAC of the room 10 can be given. For example, air pressure within the room 10 may be increased so that basically no air enters the room 10 from the door opening. For another example, heating, cooling or pressure may be temporarily increased within the room 10. Even furthermore, an activity of the medical operation may cause the dynamic control. For example, activating a laser surgical tool, such as laser surgical knife, may increase negative emissions within the room 10. Consequently, based on a detection that the tool is activated, the apparatus 300 is configured to send the signal to the at least one hvac device to temporarily increase the performance of the at least one hvac device.

In an example, a security of a patient of the operation may be improved. Improved indoor environmental conditions may help to improve the security of the patient. Under defined working conditions the concentration of air-borne contaminations can be observed and may be reduced. The amount of contamination factors within the operating room may be reduced. Energy consumption for the HVAC of the operating room may be reduced. Work of the personnel of the operating room, for example nurses, staff, etc., may be relieved. For example they do not need to focus to operating the HVAC of the operating room, but they may better focus into the actual operation. Furthermore, the thermal comfort of the operating personnel may be improved.

Figure 2:
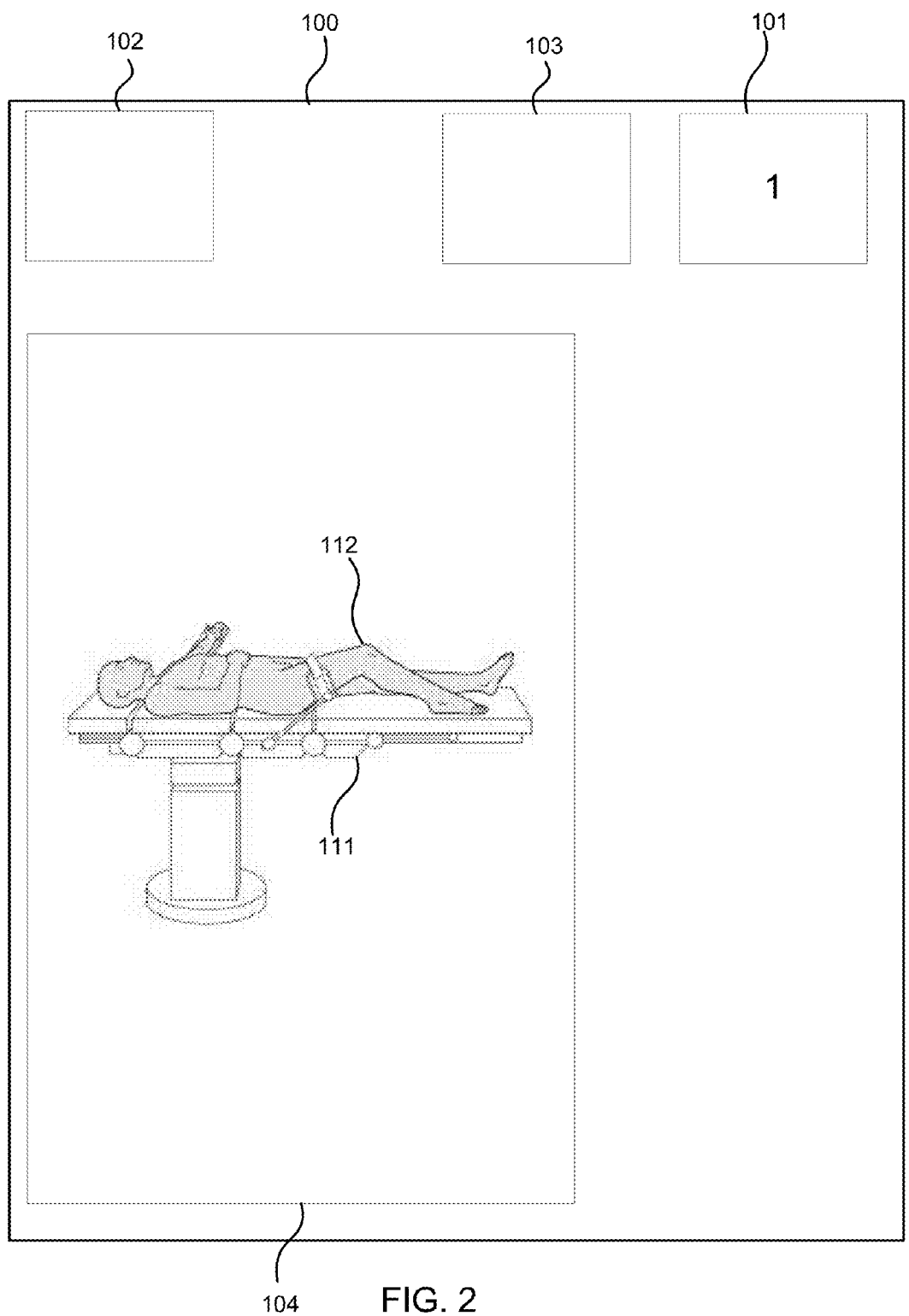
FIG. 2 is an example of a user interface in accordance with an embodiment.

In the example of FIG. 2, a user interface, UI, 100 is shown. The UI 100 comprises modules 101 . . . 103. There may be a variety of different modules for the room 10, and for the sake illustrating purposes only, three are shown. Furthermore, the example of the room 10 relates to an operating room, however other rooms are applicable as well with the examples of the UI. Each module represents a functionality of the room 10. Module 101 comprises HVAC control of the room 10. Modules 102 may relate to an operation carried out within the room, for example an operating table control, and module 103 may be a camera control, etc. Module 101 may be configured to control each room 10 individually. Alternatively module 101 may be configured to control two or more, or all, rooms.

An example relates to an operating room (OR) also known as an operating theater, an operating theatre, or an operating suite, is a facility within a hospital where medical operations are carried out in a sterile environment. For example a surgical operation is typically carried out in the operating room. The operating room comprises several pieces of equipment. The 100 UI may be configured to control any of the operation room equipment. The operating table in the center of the room can be raised, lowered, and tilted in any direction. The operating room lights are over the table to provide bright light, without shadows, during surgery. The anesthesia machine is at the head of the operating table. This machine has tubes that connect to the patient to assist him or her in breathing during surgery, and built-in monitors that help control the mixture of gases in the breathing circuit. The anesthesia cart is next to the anesthesia machine. It contains the medications, equipment, and other supplies that the anesthesiologist may need. An electronic monitor (which records the heart rate and respiratory rate by adhesive patches) is placed on patient's chest. The pulse oximeter machine attaches to the patient's finger with an elastic band aid. It measures the amount of oxygen contained in the blood. An automated blood pressure measuring machine automatically inflates the blood pressure cuff on patient's arm. An electrocautery machine uses high frequency electrical signals to cauterize or seal off blood vessels and may also be used to cut through tissue with a minimal amount of bleeding. If surgery is required, a Heart-lung machine, or other specialized equipment, may be brought into the room. Hybrid Operating Rooms integrate diagnostic imaging systems such as MRI and Cardiac Catheterization into the operating room to assist surgeons in specialized Neurological and Cardiac procedures. Sterile instruments to be used during surgery are arranged on a stainless steel table.

Module 101 comprises an indicator such as a number "1" as shown in the FIG. 2. This indicator represents a level of criticality of the operation conducted within the room 10. For example, ISO standardization may contain and determine the levels of criticality for operations. The levels may be 1, 2, 3, and 4 so that, for example, some surgical operations may require higher level than the others. Each level comprises predetermined HVAC settings, for example temperature, ventilation, pressure difference, humidity, and level of particles. The indicator may be highlighted (not shown in FIG. 2). In another example, a highlighting symbol appears approximate to the indicators (not shown in FIG. 2). This may indicate HVAC values of the room 10 are not corresponding to the values of the level of the indicator. However, the HVAC control is processing for reaching the appropriate values. In another example, this may indicate that the operating being conducted at the room 10 has imbalanced or shocked the indoor environmental conditions of the operating room. The indoor environmental conditions are not within the required level of criticality. HVAC is running in order to meet the level of criticality. Once the indoor environmental conditions are within the required level of the criticality, the highlight goes off and HVAC is set accordingly for maintaining the indoor environmental conditions corresponding to the level of criticality.

The module 101 is activated with respect to the room 10. FIG. 2 comprises a view 104. In the example of FIG. 1 the view is connected to the camera module 103 and shows a patient 112 lying on an operating surface 111 such as an operating table. The patient is subject to the operation, which contains at least one area subject to a contamination (not shown in FIG. 2), for example a wound area. This may be a wound area caused by a medical operation, such as a surgery, dental activity, injection, etc.

Figure 3:
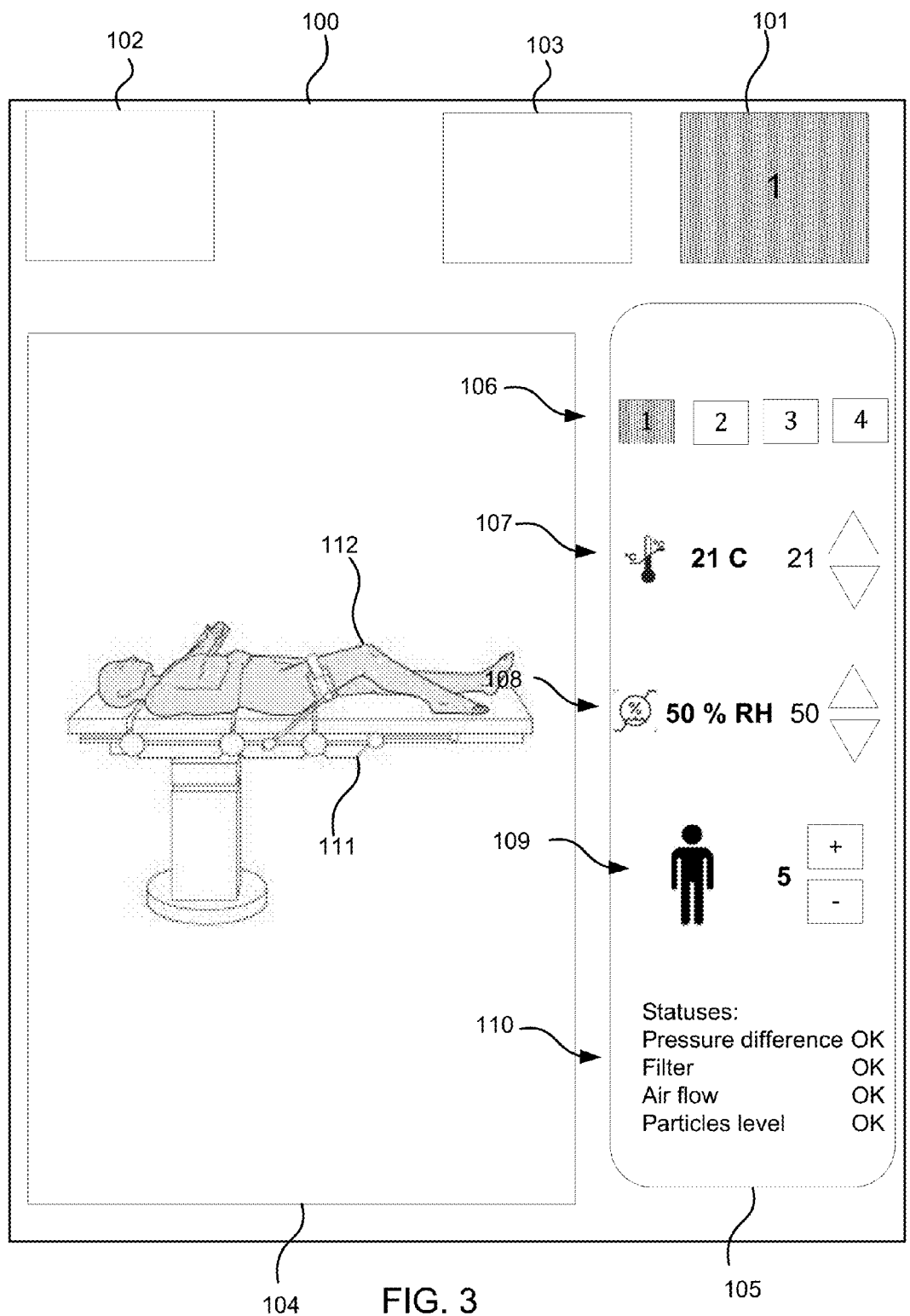
FIG. 3 is an example of a user interface in accordance with an embodiment.

In the example of FIG. 3, the HVAC module 101 is activated. The activation may, for example, take place by a user touching the module 101 on a touchscreen of the UI 100. The HVAC module 101 becomes highlighted on the UI 101. A HVAC window 105 is illustrated on the UI 100. The HVAC window 105 may be an independent user interface, with or without a connection to the management system of the operating room. The HVAC window 105 is opened by activation of the HVAC module 101. The HVAC window 105 comprises the level of criticality of the operation 106. Each level, as shown by the squared 1, 2, 3, and 4 may be activated on the touchscreen. In FIG. 2 "1" is activated. HVAC window 105 comprises a temperature of the operating room 107. Temperature may be set by up and down arrows. A current temperature "21" is highlighted and desired temperature "21" is not highlighted. HVAC window 105 comprises a humidity of the room 108. Humidity may be set by up and down arrows. A current humidity level "50" is highlighted and desired humidity "50" is not highlighted. HVAC window 105 comprises a number of persons 109 within the room 10 during the operation. For example, 5 persons are shown. The number of persons 109 may be increased or decreased by "+" or "−" as shown in the squares. For example, user may touch the respective buttons on the touchscreen. Number of persons 109 affects the HVAC of the room 10. For example, more persons in the operating room require higher performance of HVAC, especially with respect to the air flow. Statuses of HVAC 110 are shown at the bottom of window 105. This may, for example, show statuses of pressure difference, filter, air flow, particles level, etc. Status may be OK or not OK, NOK.

The HVAC contents of HVAC window 105 may alter. For example, a pressure difference may be illustrated and adjustable, both by target level and manually by touchscreen buttons. HVAC window 105 may comprise the pressure difference.

The apparatus 300 is configured to control at least one HVAC device 11, 12, 13, 14 of the room 10. The apparatus 300 may control all HVAC devices 11, 12, 13, 14 of the room 10. The HVAC device 11, 12, 13, 14 may be controlled individually and/or with the combined effect of several HVAC devices 11, 12, 13, 14. The HVAC devices 11, 12, 13, 14 are configured to heating, ventilating, and air conditioning of the room 10. There may be a single HVAC device 11, 12, 13, 14, or several HVAC devices 11, 12, 13, 14, for each of them (heating, ventilation and air condition).

Figure 4:
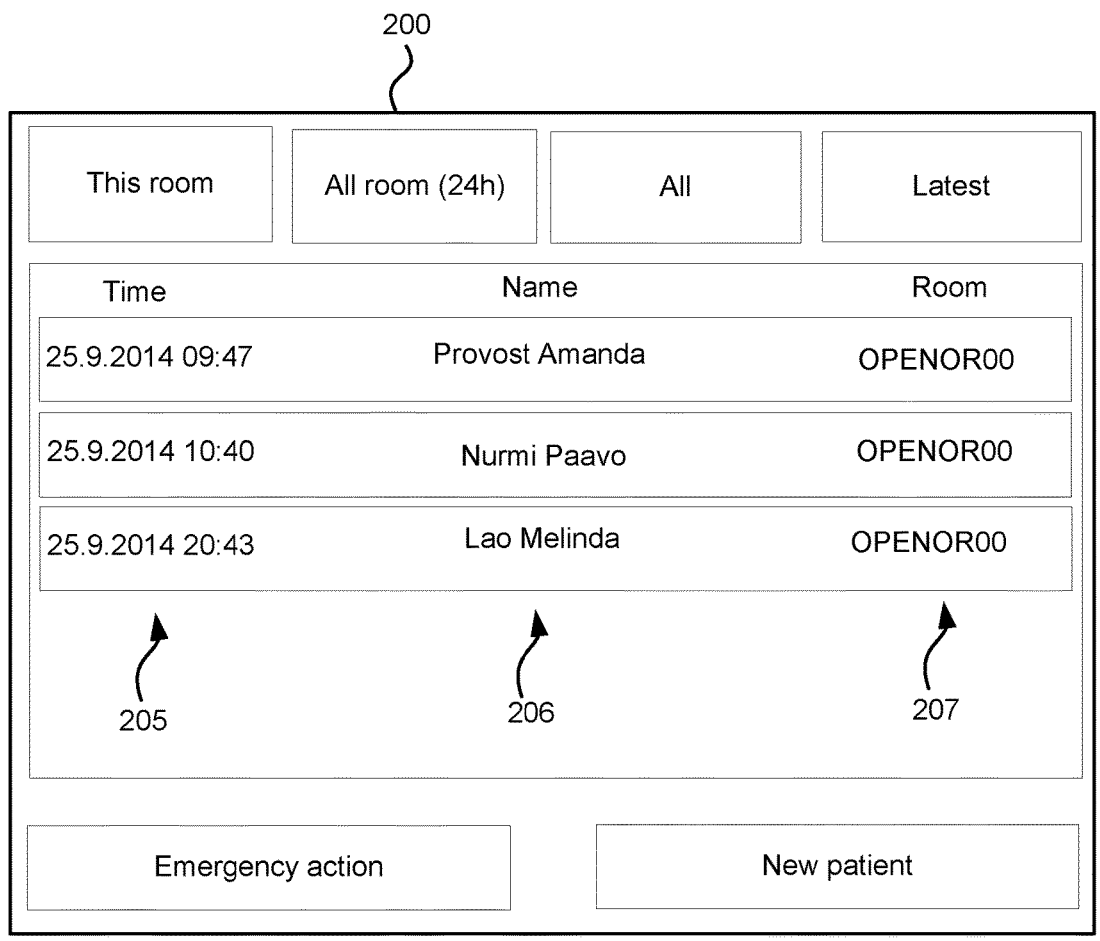
FIG. 4 is an example of a worklist of patient information management system.

FIG. 4 is an example of a related external data affecting the control of the level of cleanness of the indoor environmental condition of the room 10. A worklist 200 of patient information management system is shown. For example, this may be a worklist of hospital, and hospital patient information management system. The work list may be illustrated within the user interface 100, or in a separate patient management system. The apparatus 300 is configured to communicate with the worklist 200. The apparatus 300 receives data information of the worklist 200. Consequently, the worklist 200 of the patients, to be operated, can be directly and automatically uploaded time of the operation 205. Time of the operation 205 may indicate time when the operation will begin. Time of the operation 205 may further contain information about any breaks of the operation. Worklist 200 comprises also name of the patient 206 and the operating room 207. Worklist 200 may also contain the level of criticality of the operation for each operation or patient. Data of the worklist 200 can be used to control HVAC of the room 10. This may also consider time so that the room 10 is cleaned by HVAC before the start of the operation. During non-use of the operating room, HVAC of the operating room may be set to economy mode, for example, during night hours and weekends. Significant energy savings can be obtained. Furthermore, because the level of criticality of the operation can be received, by the control apparatus, from the worklist, easy and automatic use of HVAC can be achieved. For example in the operating room nurses do not need to focus to adjust HVAC for each operation, but the apparatus takes care of HVAC automatically based on the worklist 200. In an example, the apparatus 300 for controlling the HVAC of the room 10 can be linked to the system or computer having the worklist 200.

Figure 5:
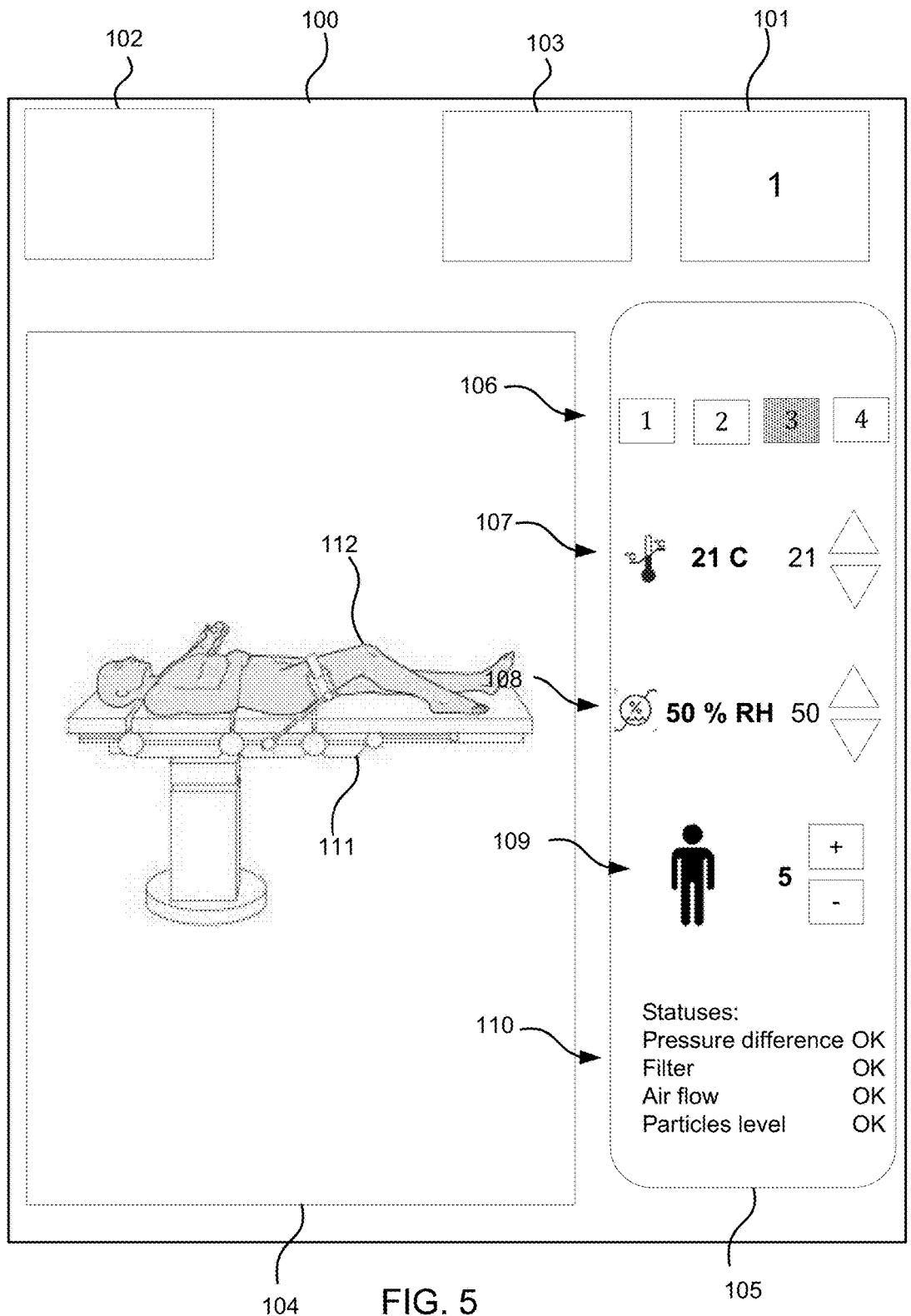
FIG. 5 is an example of a user interface in accordance with an embodiment.

FIG. 5 illustrates an example, wherein the level of criticality 106 of the operation can be manually set. The level of criticality 106 indicating "3" may be touched on the touchscreen. Consequently, the apparatus 300 gives a command to HVAC of the room 10 to change the indoor environmental conditions to correspond with the level "3". For example, something may have happened during the operation causing a need for increasing the level of criticality 106. In the example of the operating room, now the nurse may simply touch level "3" on the touchscreen and the apparatus 300 automatically takes care of the HVAC reaching the required indoor environmental conditions of level "3".

Figure 6:
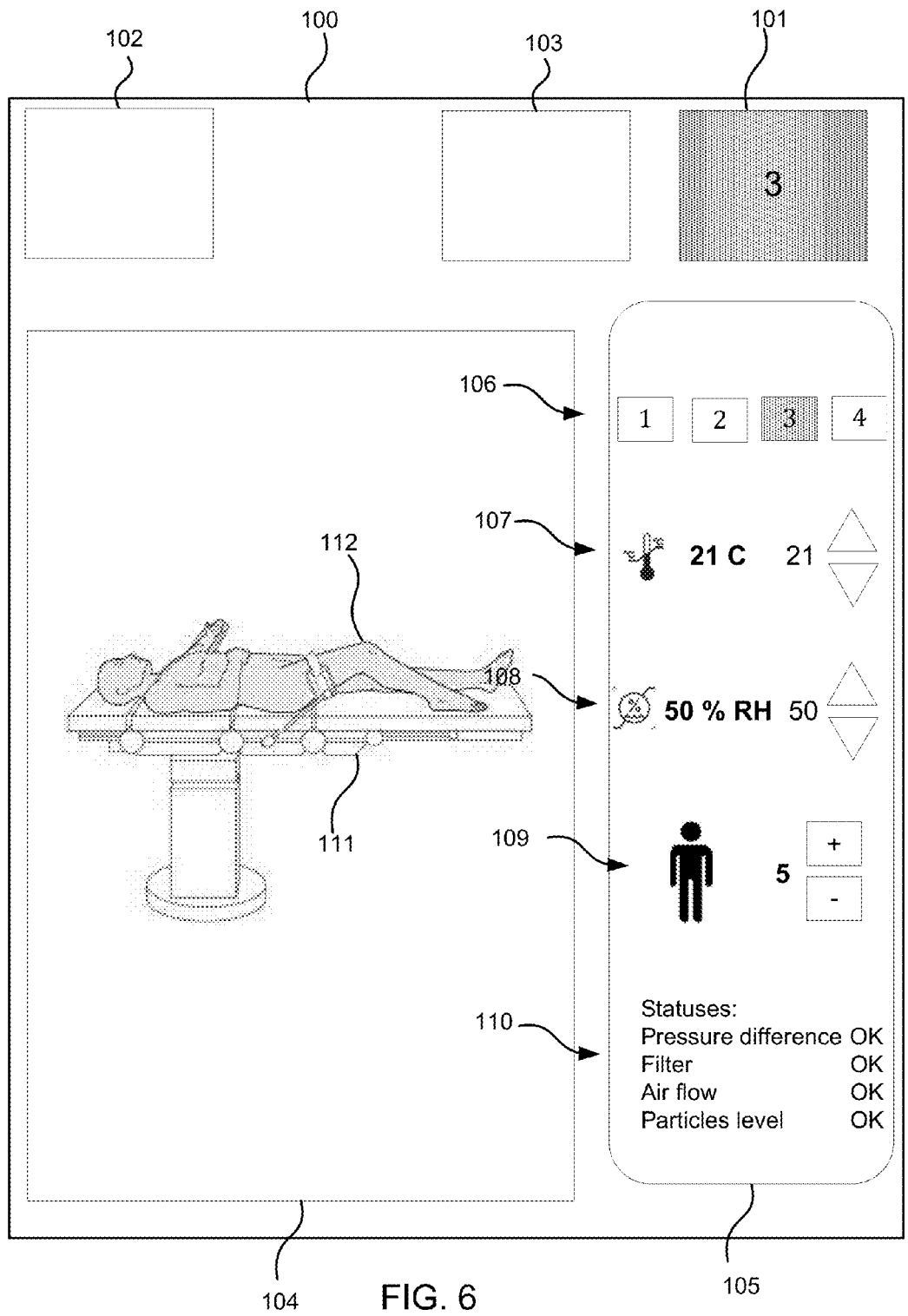
FIG. 6 is an example of a user interface in accordance with an embodiment.

FIG. 6 illustrates an example, wherein the module 101 has been changed to correspond with the level of criticality 106. Level "3" appears on the module 101 also showing the level of criticality of the operation. Module 101 may further contain a symbol indicating that the indoor environmental conditions are not within the required level (not shown in FIG. 6). Module 101 may further contain a symbol indicating how much is missing to meet the required level (not shown in FIG. 6).

Figure 7:
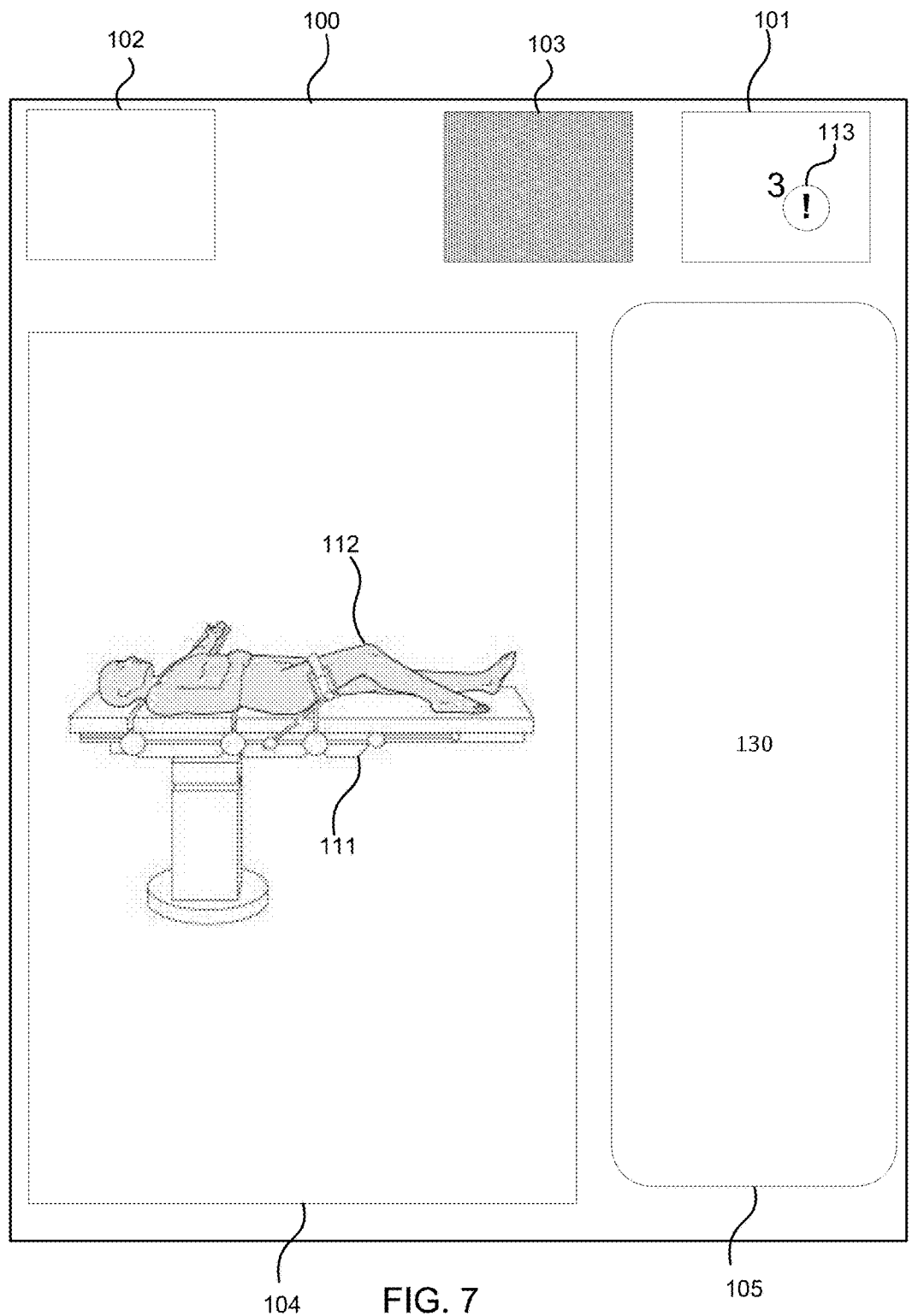
FIG. 7 is an example of a user interface in accordance with an embodiment.

FIG. 7 illustrates an example of a maintenance need appearing on the module 101. FIG. 7 shows an exclamation mark 113 appearing on the module 101. This appears due to the need for a maintenance action of the HVAC of the room 10. For example, this may indicate a need to do maintenance work for the HVAC. However, the operation may not be at risk and do not necessarily require interruption of the operation. The need for maintenance may be also automatically conveyed to estate manager of the room 10, for example to an estate manager of the hospital.

Figure 8:
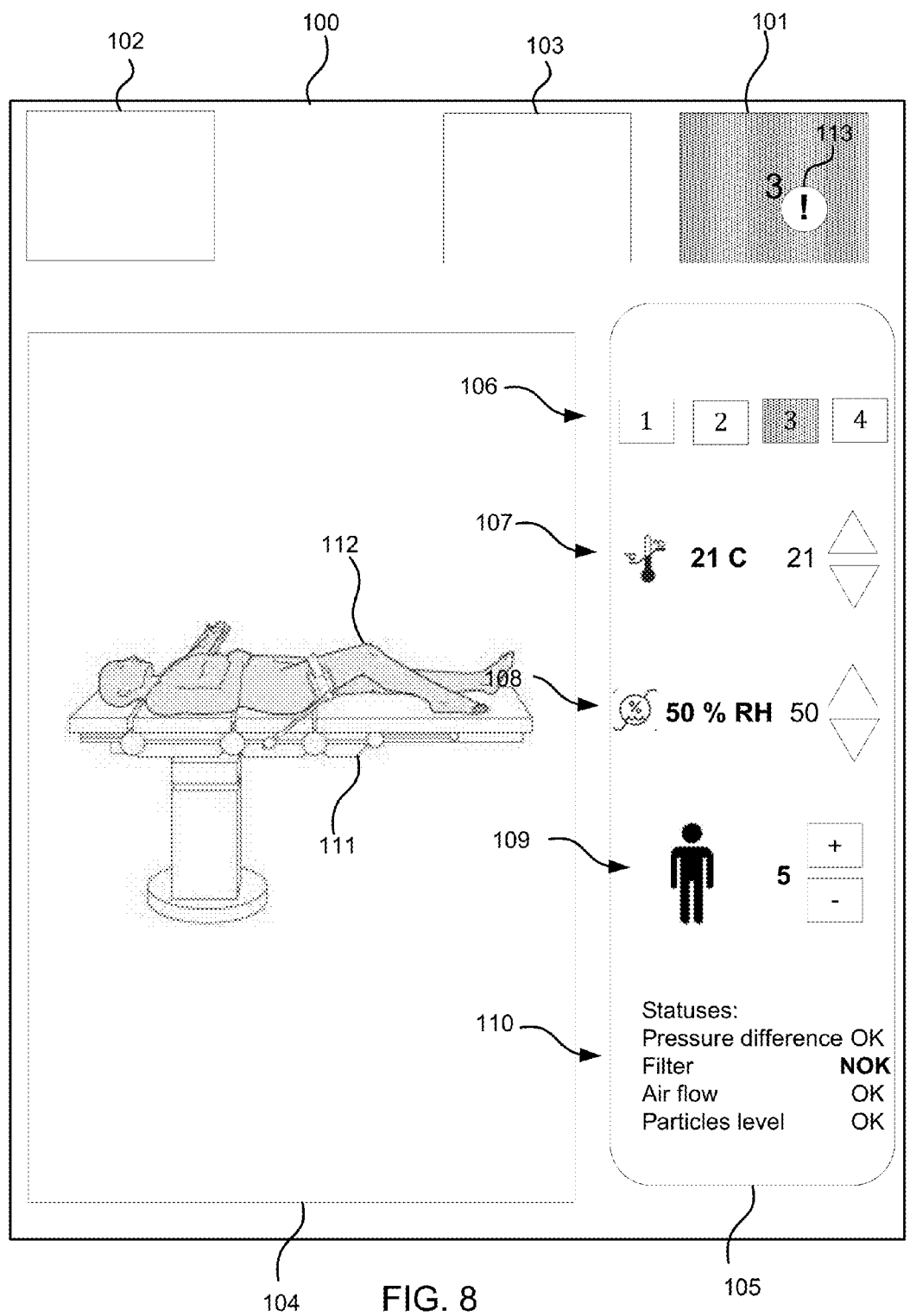
FIG. 8 is an example of a user interface in accordance with an embodiment.

In the example of FIG. 8, being based on the FIG. 7 announcement at the module 101, the user may open the window 105 by touching the module 101. The filter needs maintenance. Now, the status 110 of the filter is NOK showing the need for maintenance of the filter of the HVAC of the room 10. In an example, the exclamation mark 113 and the status of the filter NOK cannot be an acknowledgement within the user interface 100. These may, for example, be only acknowledged by performing the maintenance action and doing acknowledgement in this context.

Figure 9:
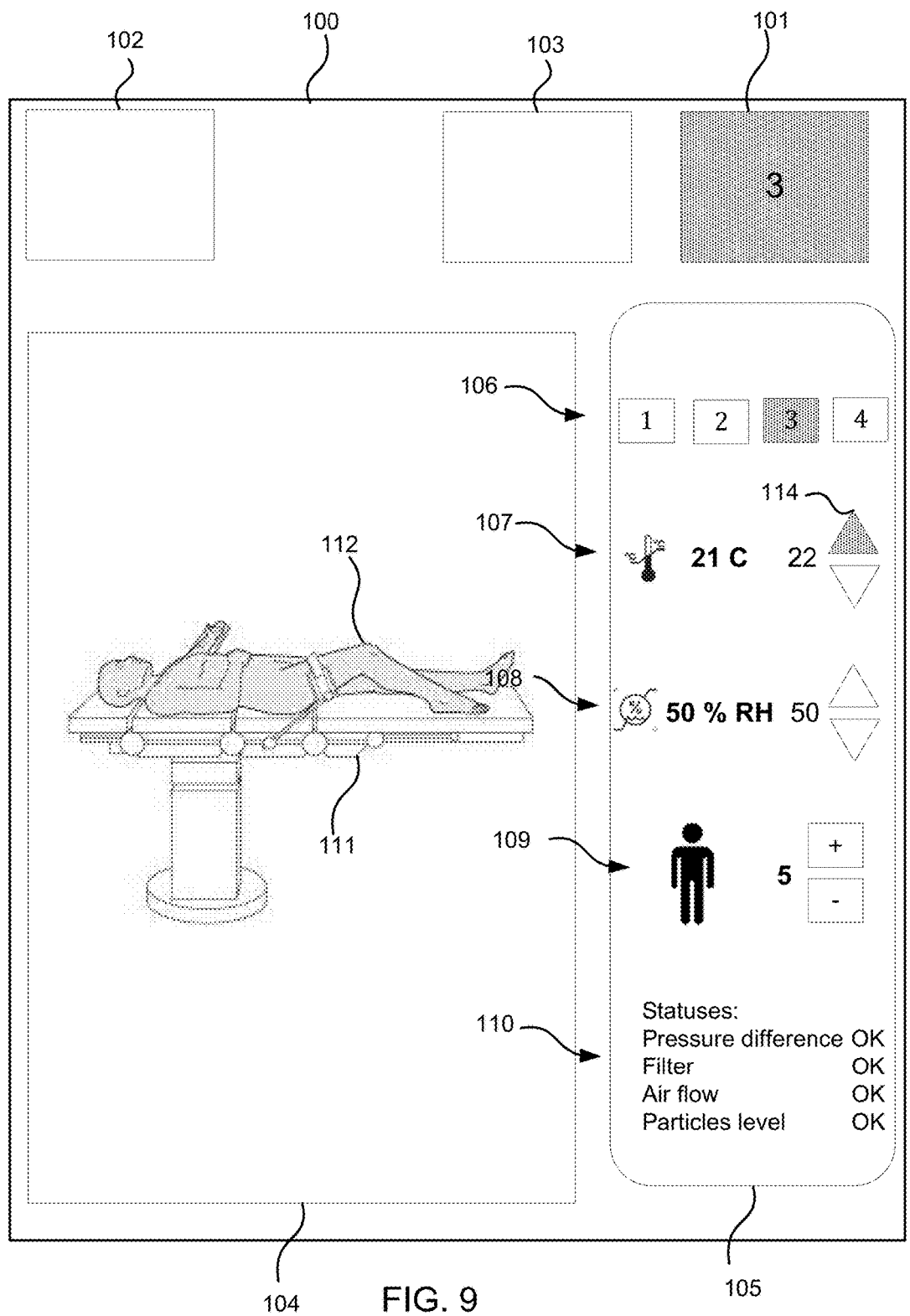
FIG. 9 is an example of a user interface in accordance with an embodiment.
Figure 10:
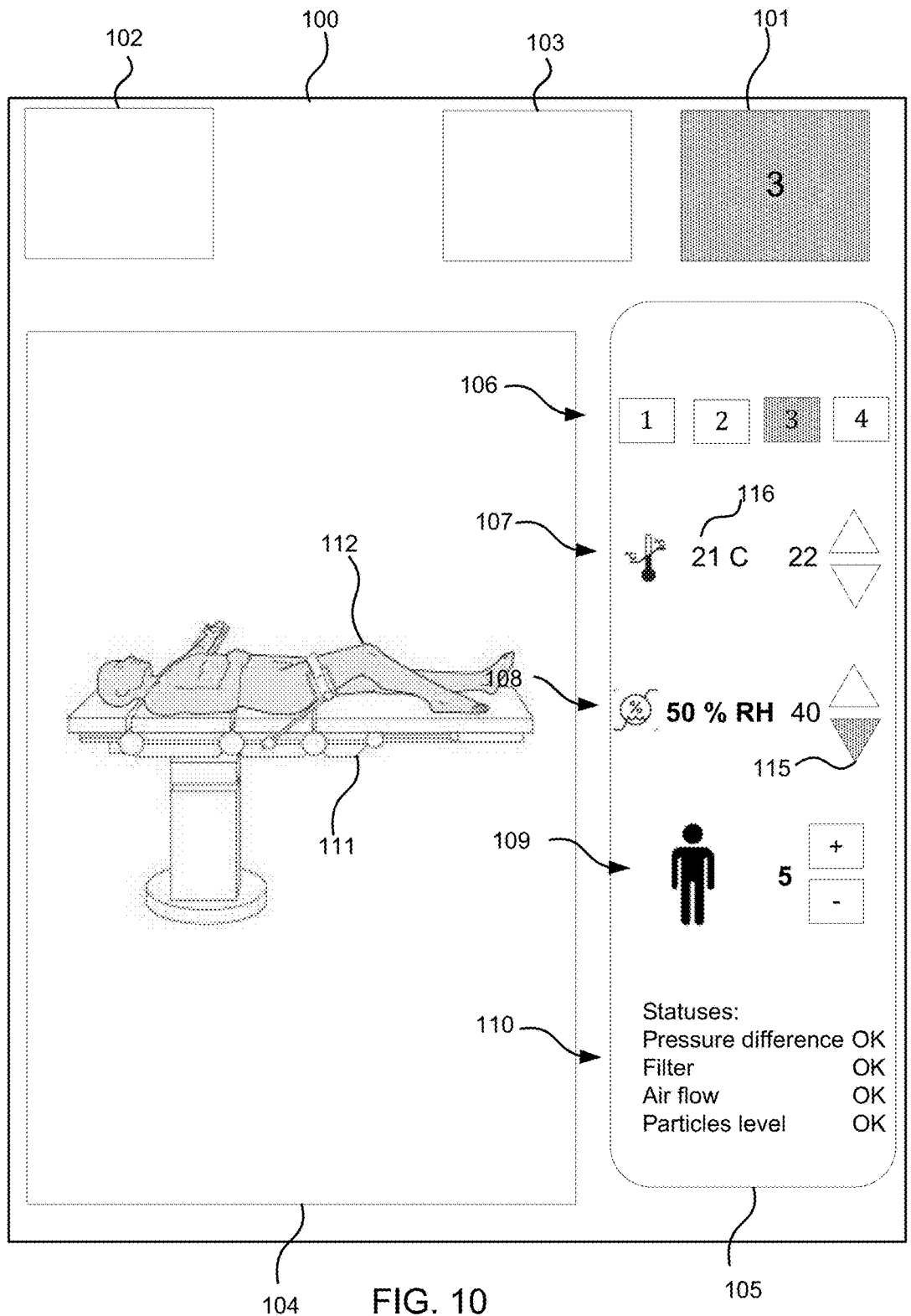
FIG. 10 is an example of a user interface in accordance with an embodiment.
Figure 11:
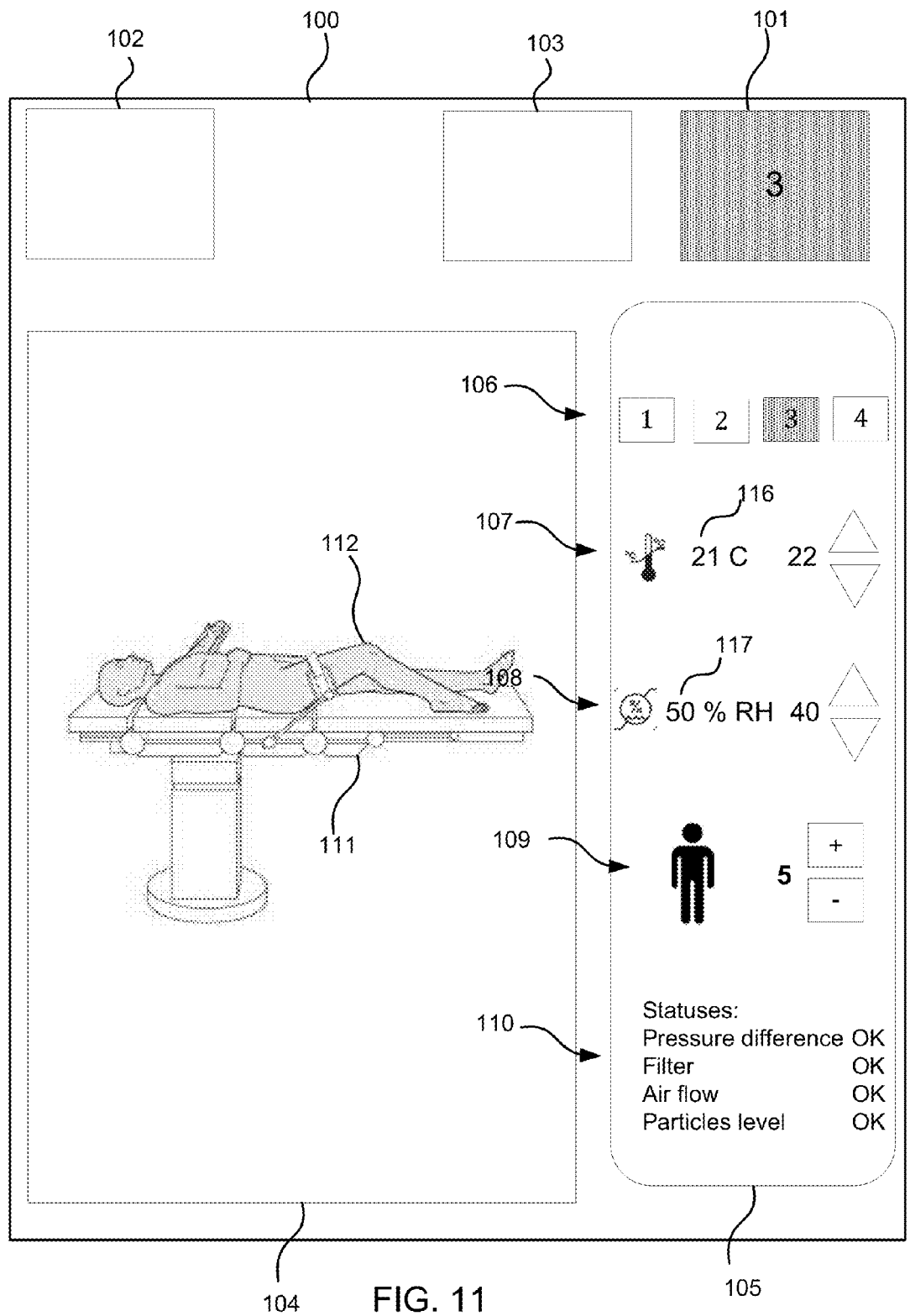
FIG. 11 is an example of a user interface in accordance with an embodiment.

Indoor environmental conditions may be manually adjusted. In the example of FIG. 9, the user touched temperature increase triangle 114 on the touchscreen. The temperature will be increased from 21C to 22C. The actual temperature is shown as bolded "21". After the user interface 100 has received the touch, the apparatus 300 starts to control HVAC for changing the temperature. In FIG. 10 the temperature "21" 116 is not bolded, which indicates that the apparatus 300 is working for reaching the target value "21". After the target value has been reached the actual temperature is shown as "22". In the example of FIG. 10 the user touches triangle 115 to reduce humidity of the room 10. The control apparatus 300 starts to activate HVAC for reducing the humidity within the room 10. FIG. 11 illustrates as example, wherein the actions of FIG. 10 and FIG. 9 are being carried out by HVAC of the room 10. In the example of FIG. 11 the actual temperature 116 and the actual humidity 117 are not highlighted so that the HVAC of the room 10 is operating to reach the target values 22C and 40, respectively. When the target values have been reached, the actual temperature value 116 and the actual humidity value are highlighted.

Consequently, each indoor environmental condition can be adjusted one-by-one. For another example, two or more indoor environmental conditions can be adjusted simultaneously. In an example, the apparatus 300 may control the indoor environmental conditions of the room 10 and the user can fine tune these conditions.

Figure 12:
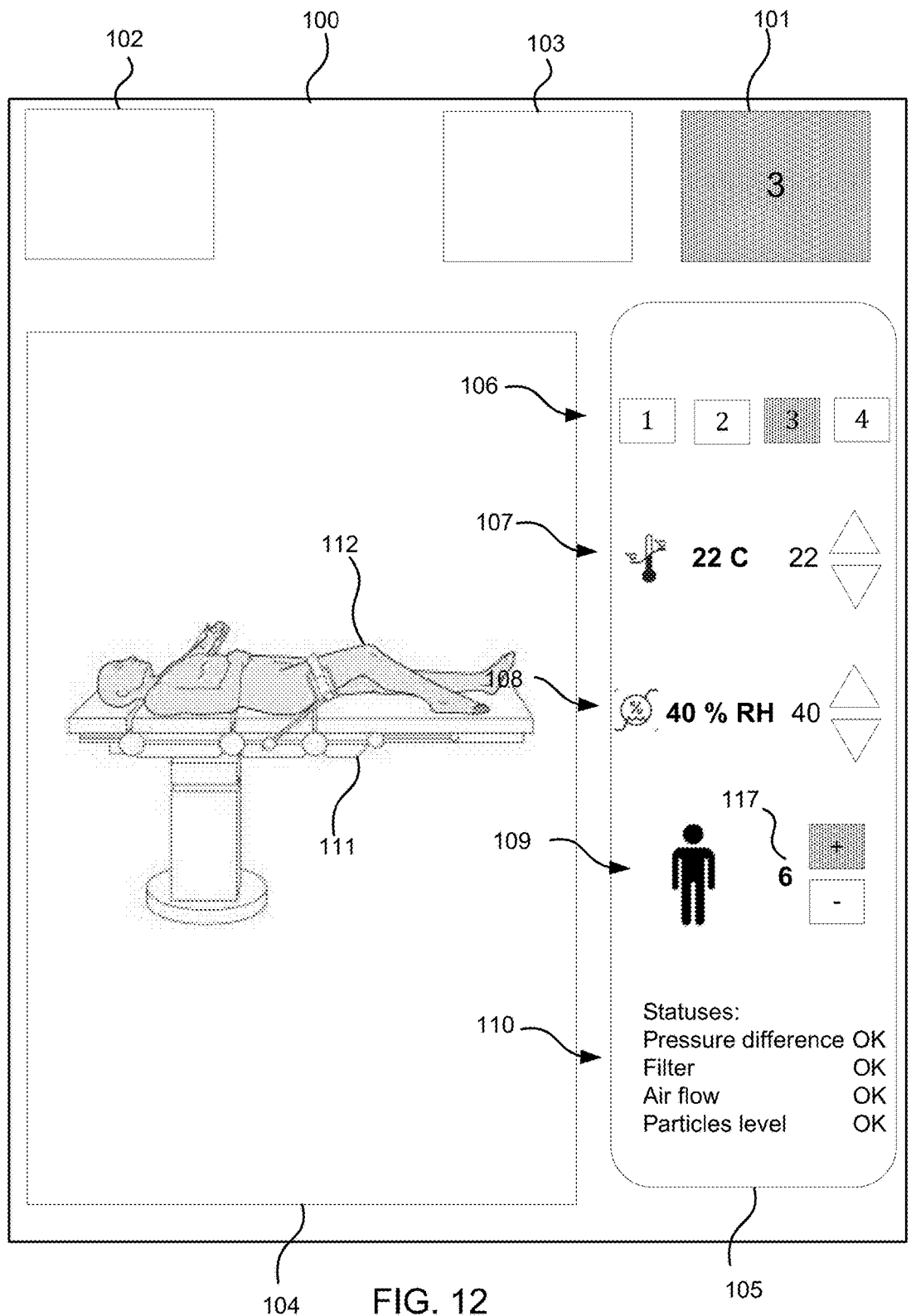
FIG. 12 is an example of a user interface in accordance with an embodiment.

FIG. 12 illustrates an example for adjusting the number of person 109 within the room 10. The user may touch the square having a symbol "+" for increasing the number of person within the room 10. In the example, the number is increased from 5 to 6. For example, further personnel enters the room 10, and personnel manually increases the number of persons 109. The apparatus 300 commands HVAC to adjust the indoor environmental conditions so that the number of person within the room 10 is 6, instead of the previous 5. For example, ventilation may be adjusted higher and heating slightly lower, etc. In an example, the number of person may be adjusted manually via the UI 100.

According to an example, number of person 109 can be adjusted automatically. For example, the number of persons entering and leaving the room 10 can be detected, and accordingly the apparatus 300 may configure HVAC of the room 10 automatically based on the detected number of persons within the room 10. The room 10 may also contain one or more detectors 15 for detecting the number of persons within the room 10. For example, the detection may be based on an ID card of personnel. The ID card may contain an identifier, such as RFID that can be detected by a detector 15 of the room 10. Detection and automatic adjustment of HVAC of the room 10 can be real-time and react quickly for the change of the number of persons within the room 10. Furthermore, the number of persons in the room 10 can be obtained from the worklist 200, or from an external computer system.

Figure 13:
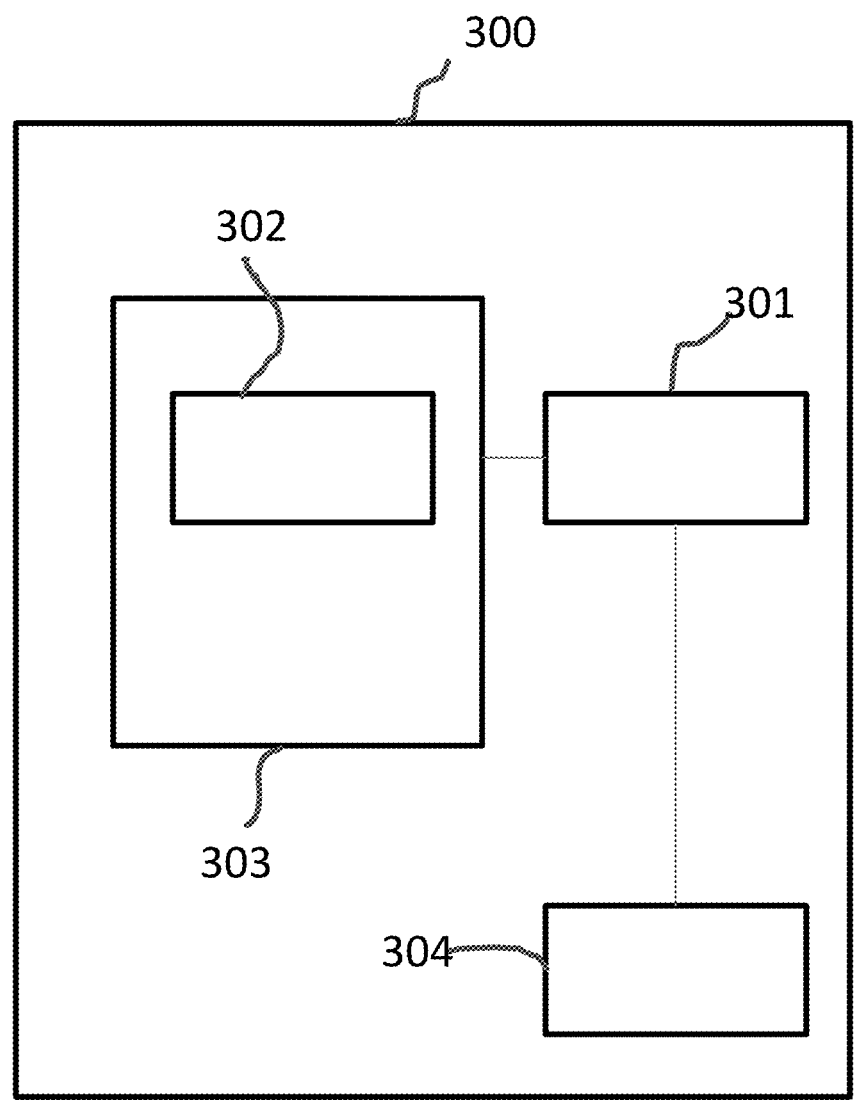
FIG. 13 is a schematic diagram of an apparatus according to an embodiment.

A schematic diagram of the apparatus 300 of controlling at least one indoor environmental condition of an operating room is shown in FIG. 13. The apparatus 300 can be a computing device in a real estate facility of the room 10, for example in a hospital. The apparatus 300 may include a processing means 301 such as a microprocessor or Application Specific Integrated Circuit (ASIC) a storage unit 303 and a communication interfacing unit 304. The storage unit 303 may be any data storage device that can store a program code 302, accessed and executed by the processing means 301. Examples of the storage unit 303 include but are not limited to read-only memory, ROM, flash memory, random-access memory, RAM, CD-ROM/DVD-ROM, magnetic tape, hard disk and optical data storage device. The communication interfacing unit 304 may be a transceiver and is used to transmit and receive signals, for example, messages or packets, according to processing results of the processing means 301. The functionality described herein can be performed, at least in part, by one or more hardware logic component. The apparatus 300 may be configured to perform the operations described in the examples. The apparatus 300 comprises the user interface such as a touch sensitive area. Instead, touch gestures may be applied. The touch sensitive area may also output information of the apparatus 300. For example a touchscreen can be used.

Figure 14:
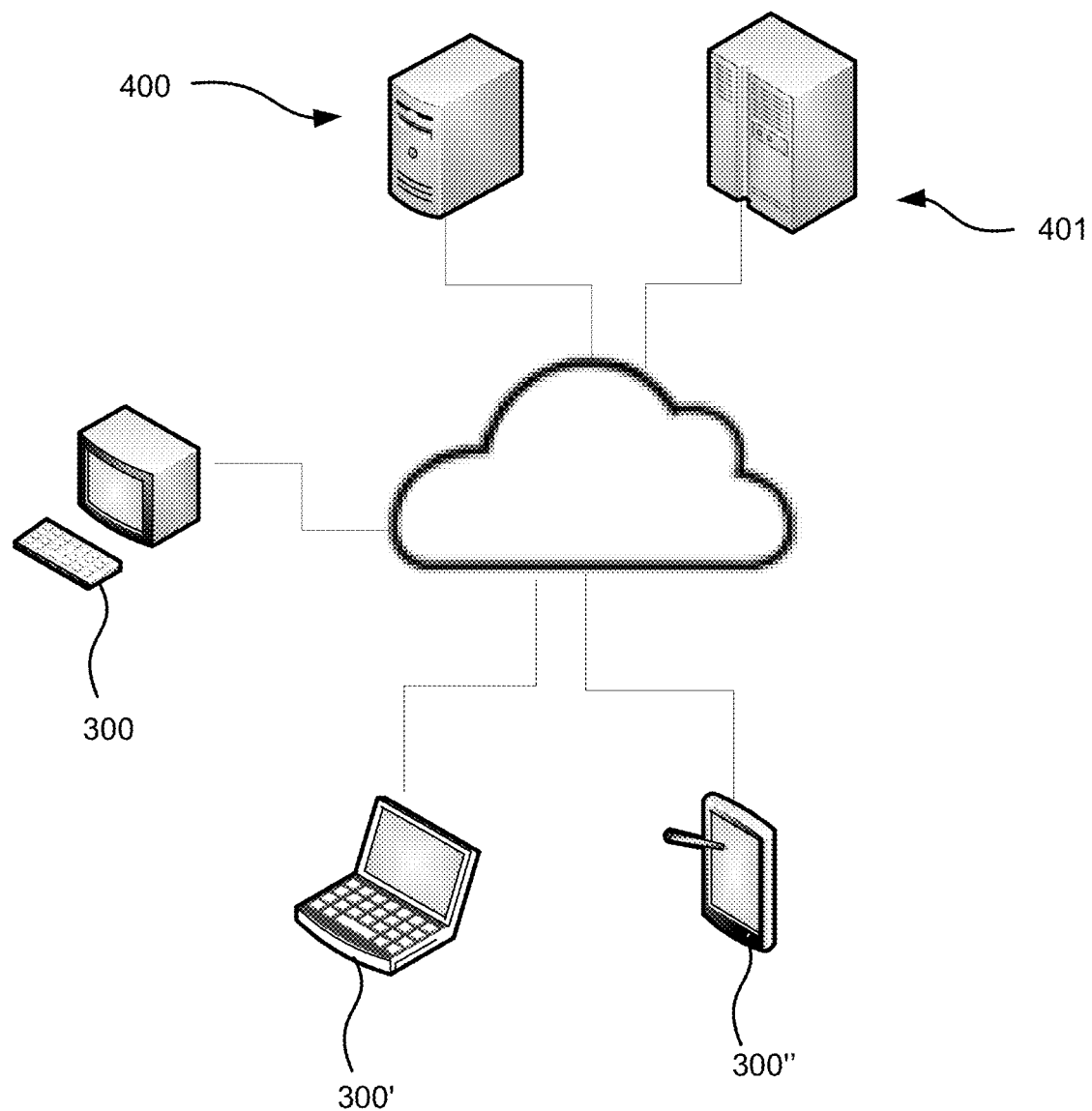
FIG. 14 is a schematic diagram of a system in accordance with an embodiment.

FIG. 14 illustrates an example of system of controlling at least one indoor environmental condition of an operating room. The system comprises several apparatuses 300, 300', 300" which can communicate with cloud servers 400, 401. For example, a big hospital or a communal or enterprise hospital community may control the indoor environmental conditions of each operating room the community has.

Figure 15:
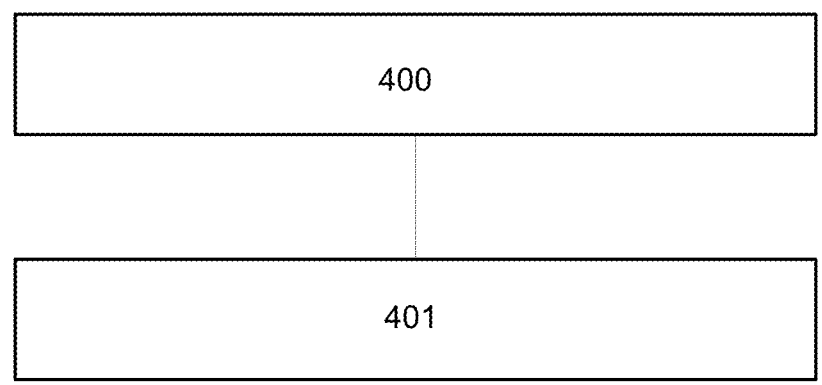
FIG. 15 is a schematic flow chart of process in accordance with an embodiment.

Referring to FIG. 15, the process is utilized in the apparatus 300 shown in FIG. 13, for controlling indoor environmental conditions of the operating room. The process of FIG. 15 may be compiled into the program code 302. The process includes the following steps:

Step 400: Receive data of a number of persons.
Step 401: transmit a signal to at least one HVAC device.

According to the process, the indoor environmental conditions of the room 10 are being controlled. Data of a number of persons within the room 10 is received in the step 400, for example the number of persons in the room 10 within an ongoing operation. Based on the received data, a signal is transmitted to at least one HVAC device 11, 12, 13, 14 of the room 10. The at least one HVAC deice controls the level of cleanness of the indoor environmental condition of the room 10. For example, a worklist 200 shows that three trainees attend a surgical operation in addition to normal staff. HVAC receives this information and automatically increases ventilation and decreases heating.

In addition to the number of persons affecting the indoor environmental conditions of the operating room, clothing of the staff may affect the indoor environmental conditions. For example, staff of the operating room may have certain type of protective clothing, and the clothing may have an amount of separated particles, insulation.

For a person skilled in the art, it is obvious that numerous modifications and variations can be made to the equipment and method. Other embodiments and exemplary implementations become evident to a person skilled in the art on the basis of the specification and practice related to the equipment and method described. The purpose is that the specification and the examples be regarded only as exemplary, so that the following patent claims and their equivalents show the actual scope of protection.

The invention claimed is:

1. An apparatus for controlling at least one indoor environmental condition of a clean room for an operation subject to a contamination, comprising:
at least one processor, and at least one memory storing program instructions that, when executed by the at least one processor, cause the apparatus to:
receive first data of a number of persons within the room during the operation;
receive, before the operation, second data of a known quality of clothing worn by the persons during the operation, including known characteristics in relation to particle release of the persons;
based on the first data and the second data, send a signal to at least one hvac device of the room configured to control a level of cleanness of the room to pre-adjust ventilation of the room for the operation.

2. The apparatus of claim 1,
wherein the level of cleanness is based on at least an amount of a ventilation of the room; or
wherein the ventilation is partly based on an amount of air entering the room; or
wherein the level of cleanness is partly based on an amount of air leaving the room; or
wherein the air entering the room is made hygienic.

3. The apparatus according to claim 2, wherein the program instructions further cause the apparatus to: receive third data identifying a medical operation or a pharmaceutical, manufacturing or processing activity occurring in the room; and based on the first data, the second data and the third data, send a signal to the at least one hvac device of the room configured to control the at least one indoor environmental condition.

4. The apparatus according to claim 2, wherein the first data is received from a computing system detecting the number of persons within the room.

5. The apparatus according to claim 2,
wherein the first data is received automatically, without a human intervention; or
wherein the first data or the second data is manually entered to the apparatus.

6. The apparatus according to claim 1, wherein the program instructions further cause the apparatus to:
receive third data identifying a medical operation or a pharmaceutical, manufacturing or processing activity occurring in the room; and
based on the first data, the second data and the third data, send a signal to the at least one hvac device of the room configured to control the at least one indoor environmental condition by adjusting ventilation of the room.

7. The apparatus according to claim 6,
wherein the third data is received from a worklist of a patient management system; or
wherein the third data comprises a type of medical operation or pharmaceutical, manufacturing or processing activity carried out within the room; or
wherein the third data further comprises a schedule of the medical operation or pharmaceutical, manufacturing or processing activity; or
wherein the third data comprises a level of criticality of the medical operation.

8. The apparatus according to claim 1, wherein the first data is received from a computing system detecting the number of persons within the room.

9. The apparatus according to claim 1,
wherein the first data is received automatically, without a human intervention; or
wherein the first data or the second data is manually entered to the apparatus.

10. The apparatus according to claim 1,
wherein a reception of information about an activity, which increases emissions within the room, causes the apparatus to further send the signal; or
wherein the at least one memory storing program instructions that, when executed by the at least one processor, causes the apparatus further to:
receive third data indicating that a door of the room is opened; and
based on the third data, send a signal to the at least one hvac device for temporarily increase a performance of the at least one hvac device configured to control the level of the cleanness.

11. The apparatus according to claim 1,
wherein the clean room comprises an operating room,
wherein the operating room comprises an operating surface on which is provided an area subject to a contamination, and
wherein the program instructions further cause the apparatus to:
receive third data identifying a medical operation causing the area subject to the contamination; and
based on the first data, the second data and the third data, send a signal to at least one hvac device of the operating room configured to control the indoor environmental condition by adjusting ventilation of the room.

12. The apparatus according to claim 11, wherein the program instructions further cause the apparatus to:
receive fourth data of an activity occurring as part of the medical operation; and
based on the first data, the second data, the third data and the fourth data, send a signal to at least one hvac device of the operating room configured to control the indoor environmental condition by adjusting ventilation of the room.

13. The apparatus according to claim 1,
wherein the apparatus is linked to a management system of the room, and the first data is received from the management system; or
wherein the apparatus is linked to a real estate system of the room, and the first data is received from the real estate system; or
wherein the apparatus is linked to a patient management system, and the first data is received from the patient management system.

14. The apparatus according to claim 1, wherein the at least one hvac device comprises a heating device, a ventilating device, or an air conditioning device.

15. The apparatus according to claim 1, wherein the program instructions, when executed by the at least one processor, further cause the apparatus to:
receive third data of the at least one indoor environmental condition of the room; and
based on the first data, the second data and the third data, send a signal to at least one hvac device of the room configured to control a level of a cleanness of the at least one indoor environmental condition by adjusting ventilation of the room.

16. The apparatus according to claim 1,
wherein a reception of information about an activity, which increases emissions within the room, cause the apparatus to further send the signal; or
wherein the at least one memory storing program instructions that, when executed by the at least one processor, cause the apparatus further to:
receive third data indicating that a door of the room is opened; and
based on the third data, send a signal to the at least one hvac device for temporarily increase a performance of the at least one hvac device configured to control the level of the cleanness.

17. A method of controlling at least one indoor environmental condition of a clean room for an operation subject to a contamination, comprising:
receiving first data of a number of persons within the room during the operation;
receiving, before the operation, second data of a known quality of clothing worn by the persons during the operation, including known characteristics in relation to particle release of the persons;
based on the first data and the second data, sending a signal to at least one hvac device of the room configured to control a level of cleanness of the room to pre-adjust ventilation of the room for the operation.

18. A computer program product, comprising programmable means configured to cause a computer to perform the steps of the method of claim 17.

19. A system comprising:
at least one hvac device configured to control a level of a cleanness of a clean room for an operation subject to a contamination by adjusting ventilation of the room; and
an apparatus comprising
at least one processor, and at least one memory storing program instructions that, when executed by the at least one processor, cause the apparatus to:
receive first data of a number of persons within the room during the operation;
receive, before the operation, second data of a known quality of clothing worn by the persons during the operation, including known characteristics in relation to a particle release of the persons;
based on the first data and the second data, send a control signal to the at least one hvac device of the room to pre-adjust ventilation of the room for the operation.

* * * * *